US009882399B2

(12) United States Patent
Sadayuki et al.

(10) Patent No.: US 9,882,399 B2
(45) Date of Patent: Jan. 30, 2018

(54) POWER SOURCE GENERATION CIRCUIT AND INTEGRATED CIRCUIT

(75) Inventors: Eiichi Sadayuki, Osaka (JP); Kazuki Yoshioka, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 405 days.

(21) Appl. No.: 13/297,551

(22) Filed: Nov. 16, 2011

(65) Prior Publication Data

US 2012/0062185 A1 Mar. 15, 2012

Related U.S. Application Data

(63) Continuation of application No. PCT/JP2010/000225, filed on Jan. 18, 2010.

(30) Foreign Application Priority Data

May 19, 2009 (JP) .................. 2009-121310

(51) Int. Cl.
*H02J 7/00* (2006.01)
*G05F 1/56* (2006.01)

(52) U.S. Cl.
CPC ............... *H02J 7/00* (2013.01); *G05F 1/56* (2013.01); *Y10T 307/826* (2015.04); *Y10T 307/832* (2015.04); *Y10T 307/858* (2015.04)

(58) Field of Classification Search
CPC ....................................................... H02J 7/345
USPC ............................................................ 320/166
See application file for complete search history.

(56) References Cited

U.S. PATENT DOCUMENTS

| 5,763,960 | A * | 6/1998 | Ceccherelli et al. ........... 307/41 |
| 6,191,687 | B1 * | 2/2001 | Dlugos et al. ................ 340/506 |
| 6,340,852 | B1 * | 1/2002 | Mizoguchi .................... 307/125 |
| 2005/0062459 | A1 | 3/2005 | Young et al. |
| 2007/0001747 | A1 * | 1/2007 | von Kaenel .................. 327/538 |
| 2009/0009135 | A1 * | 1/2009 | Wong et al. .................. 320/134 |
| 2009/0273327 | A1 | 11/2009 | Ito et al. |

FOREIGN PATENT DOCUMENTS

| JP | 57-017031 | 1/1982 |
| JP | 61-161529 | 7/1986 |
| JP | 11-086542 | 3/1999 |
| JP | 2000-339042 | 12/2000 |
| JP | 2001-306167 | 11/2001 |

(Continued)

OTHER PUBLICATIONS

International Search Report of PCT/JP2010/000225, dated Feb. 16, 2010.

(Continued)

*Primary Examiner* — Nathaniel Pelton
(74) *Attorney, Agent, or Firm* — McDermott Will & Emery LLP

(57) ABSTRACT

A power source generation circuit includes a regulator circuit which receives an external power source voltage VDDA from an external power source, and generates a predetermined internal power source voltage on a given terminal VDD; and a charging circuit which connects the external power source and the given terminal when the external power source voltage VDDA supplied from the external power source is equal to or lower than a predetermined threshold voltage.

21 Claims, 4 Drawing Sheets

(56) References Cited

FOREIGN PATENT DOCUMENTS

| JP | 2002-201680 | 7/2002 |
| JP | 2002-525616 | 8/2002 |
| WO | 00/17997 | 3/2000 |
| WO | 2007066583 A1 | 6/2007 |

OTHER PUBLICATIONS

Office Action issued in U.S. Appl. No. 13/975,146 dated Nov. 14, 2013, 23 pages.
Examiner-Initiated Interview Summary Record U.S. Appl. No. 13/975,146 dated May 20, 2014.
U.S. Office Action issued in U.S. Appl. No. 13/975,146 dated Jul. 31, 2014.
LM3204 Miniature, Adjustable, Step-Down DC-DC Converter with Bypass Mode for RF Power Amplifiers, Texas Instruments, Apr. 2013.
LM3204 Miniature, Adjustable, Step-Down DC-DC Converter with Bypass Mode for RF Power Amplifiers, Texas Instruments, Jun. 2015.
LM2706 Miniature, Variable, Step-Down DC-DC Converter with Bypass for RF Power Amplifiers, National Semiconductor Corporation, Feb. 2004.
LM3200 Mniature, Adjustable, Step-Down DC-DC Converter with Bypass Mode for RF Power Amplifiers, Texas Instruments, Nov. 2004.
LM3204 Miniature, Adjustable, Step-Down DC-DC Converter with Bypass Mode for RF Power Amplifiers, Texas Instruments, Jun. 2005.
LM3280 Adjustable Step-Down DC-DC Converter and 3 LDOs for RF Power Management, Texas Instruments, Oct. 2006.

\* cited by examiner

POWER SOURCE GENERATION CIRCUIT AND INTEGRATED CIRCUIT

CROSS REFERENCE TO RELATED APPLICATION

This is a continuation application of PCT application No. PCT/JP2010/000225 filed Jan. 18, 2010, designating the United States of America.

BACKGROUND OF THE INVENTION (1) Field of the Invention

The present invention relates to a power source generation circuit, and in particular to a power source generation circuit and an integrated circuit in which an internal power source voltage is generated at a high speed.

(2) Description of the Related Art

In the field of utility meters such as water meters which measure a volume of water used, there is a water meter system which uses a water sensor generating a pulse signal depending on a certain volume of water and an integrated circuit counting the number of pulses of the pulse signal and thereby measures a volume of water used. An example of the integrated circuit used in the water meter system is one which acquires electric power from the pulse signal itself outputted by the water sensor, whereby a battery-free circuit is implemented.

In miniaturized integrated circuits, a constant lower power source voltage (1.8 V, for example) is internally generated from a power source voltage (3.3 V, for example) supplied from the outside, and supplied as a power source voltage to logic circuits and memory circuits in the integrated circuit. In the case of the aforementioned battery-free integrated circuit, there is a need to generate an internal power source voltage of the integrated circuit at a high speed so that a sufficient level of power source voltage is acquired from a short pulse signal.

Thus, an example of the power source generation circuit in which an internal power source voltage is generated at a high speed is a technique described in Patent Document 1 (Japanese Unexamined Patent Application Publication No. 2001-306167).

FIG. 5 is a circuit diagram of a power source generation circuit 60 described in Patent Document 1. The power source generation circuit 60 includes a switch 61, a reference power source 62, a delay unit 63, a differential amplifier 64, resisters 65 and 66, and a capacitor 67.

In the conventional power source generation circuit 60, the output stage of the differential amplifier 64 has a configuration in which an output stage buffer having a lower output impedance is connected in parallel to an output stage buffer having a higher output impedance. A switch input turns ON the switch 61 to start up the reference power source 62. The switch input is also supplied to the delay unit 63; during a period taken for the received switch input to be outputted from the delay unit 63, the output stage buffer of the differential amplifier 64 having a lower output impedance is operated, thereby charging the capacitor 67 at a high speed to generate an internal power source voltage. After the lapse of the given period, when the switch input is outputted from the delay unit 63, only the output stage buffer having a higher output impedance is operated.

SUMMARY OF THE INVENTION

However, the conventional power source generation circuit described above has the following problem.

In the reference power source and the differential amplifier used in the conventional power source generation circuit, a given period is required until the circuit is actually operated after receiving an external power source input. The reason is as follows: those circuits, such as the reference power source and the differential amplifier, have a capacitor built in the circuit, for the purpose of operation stabilization and signal noise countermeasure. Thus, a given period is required until the built-in capacitor is charged after receiving an external power source input.

Consequently, in the application which requires higher speed power source generation, there arise a problem that the time period required for initiation of the reference power source and the differential amplifier imposes limitations, and thus a required speed cannot be implemented.

An object of the present invention is to provide a power source generation circuit and an integrated circuit in which limitations imposed by start-up time of the reference power source and the differential amplifier are reduced to allow an internal power source voltage to be generated at a higher speed.

In order to solve the above problem, a power source generation circuit according to an aspect of the present invention includes a regulator circuit which receives an external power source voltage from an external power source and generates a predetermined internal power source voltage on a given terminal; and a charging circuit which is connected to the external power source, and connects the external power source and the given terminal when the external power source voltage received from the external power source is equal to or lower than a first threshold voltage.

Accordingly, limitations imposed by start-up time of the reference power source and the regulator circuit are suppressed to allow an internal power source voltage to be generated at a higher speed. More specifically, when the external power source voltage is equal to or lower than the first threshold, the charging circuit connects the given terminal and the external power source, whereby the external power source voltage is generated at the given terminal. Thus, when the regulator circuit has not been initiated yet, also, the voltage can be generated at the given terminal.

The charging circuit may include a switching transistor which has one of a source and a drain connected to the external power source and the other connected to the given terminal, and turns ON when the external power source voltage is equal to or lower than the first threshold voltage and turns OFF when the external power source voltage exceeds the first threshold voltage.

The charging circuit may include: a first resistor having one terminal connected to the external power source; a second resistor having one terminal connected to a ground; a diode having an anode connected to the other terminal of the first resistor and a cathode connected to the ground; a first p-type Metal Oxide Semiconductor (MOS) transistor having a gate connected to the anode of the diode, a source connected to the external power source, and a drain connected to the other terminal of the second resistor; and a second p-type MOS transistor being the switching transistor, and having a gate connected to the drain of the first p-type MOS transistor, a source connected to the external power source, and a drain connected to the given terminal.

The first threshold voltage may be lower than the internal power source voltage.

Accordingly, the voltage generated at the given terminal can be prevented from exceeding the internal power source voltage which is an output voltage set in the regulator circuit, thus allowing implementation of high accuracy of the internal power source voltage.

The power source generation circuit may further include a trigger signal outputting unit which outputs a predetermined trigger signal to cut connection by the charging circuit between the given terminal and the external power source Accordingly, when an element variation causes the threshold voltage set in the charging circuit to exceed the voltage set in the regulator circuit, voltage generation by the charging circuit can be forcibly stopped. Consequently, when the inventive power source generation circuit is used, the internal power source voltage, regulated at a high accuracy, can be generated.

Moreover, the trigger signal outputting unit may include a delay circuit which receives a starting signal for starting up the power source generation circuit, delays the received starting signal by a given time period, and outputs the delayed starting signal as the trigger signal to the charging circuit, and the charging circuit may cut a connection between the given terminal and the external power source based on the starting signal delayed by the delay circuit.

Accordingly, when an element variation causes the threshold voltage set in the charging circuit to exceed the voltage set in the regulator circuit, the charging circuit is stopped after the lapse of delay time of the delay circuit and only the regulator circuit generates the internal power source voltage. Thus, high accuracy of the internal power source voltage can be implemented.

In addition, the trigger signal outputting unit may include a voltage detecting circuit which outputs a voltage detecting signal as the trigger signal to the charging circuit when a voltage generated on the given terminal is equal to or higher than a second threshold voltage lower than the internal power source voltage, and the charging circuit may cut a connection between the given terminal and the external power source based on the voltage detecting signal outputted by the voltage detecting circuit.

Accordingly, when an element variation causes the threshold voltage set in the charging circuit to exceed the voltage set in the regulator circuit, the detection signal of the voltage detecting circuit stops the charging circuit. Thus, only the regulator circuit generates the internal power source voltage, allowing implementation of high accuracy of the internal power source voltage.

Furthermore, the charging circuit may include a switching transistor which has one of a source and a drain connected to the external power source and the other connected to the given terminal, and turns ON when the external power source voltage is equal to or lower than the first threshold voltage and turns OFF when the external power source voltage exceeds the first threshold voltage or based on the trigger signal.

In addition, the charging circuit includes: a first resistor having one terminal connected to the external power source; a second resistor having one terminal connected to a ground; a diode having an anode connected to the other terminal of the first resistor and a cathode connected to the ground; a first p-type MOS transistor having a gate connected to the anode of the diode, a source connected to the external power source, and a drain connected to the other terminal of the second resistor; a second p-type MOS transistor being the switching transistor, and having a gate connected to the drain of the first p-type MOS transistor, a source connected to the external power source, and a drain connected to the given terminal; and an n-type MOS transistor having a gate receiving the trigger signal, a drain connected to the gate of the first p-type MOS transistor, and a source connected to the ground.

The present invention may also be provided as an integrated circuit including: a regulator circuit which receives a pulsed external power source voltage from an external circuit and generates a predetermined internal power source voltage at a given terminal; and a charging circuit which is connected to said external circuit and, connects the external circuit and the given terminal when an external power source voltage received from the external circuit is equal to or lower than a predetermined threshold voltage.

According to the present invention, limitations imposed by start-up time of the reference power source and the regulator circuit are reduced to allow the internal power source voltage to be generated at a higher speed and at a higher accuracy.

FURTHER INFORMATION ABOUT TECHNICAL BACKGROUND TO THIS APPLICATION

The disclosure of Japanese Patent Application No. 2009-121310 filed on May 19, 2009 including specification, drawings and claims is incorporated herein by reference in its entirety.

The disclosure of PCT application No. PCT/JP2010/000225 filed, Jan. 18, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENTS

A power source generation circuit and an integrated circuit according to the present invention will be described in detail below with reference to the drawings showing preferred embodiments thereof.

Embodiment 1

A power source generation circuit according to Embodiment 1 includes a regulator circuit which receives an external power source voltage and a reference voltage respectively from an external power source and a reference power source, and generates a predetermined internal power source voltage on a given terminal; and a charging circuit which connects the external power source and the given terminal when the external power source voltage is equal to or lower than a first threshold voltage. First, a configuration of a power source generation circuit according to this embodiment will be described below with reference to FIG. 1.

Figure 1:
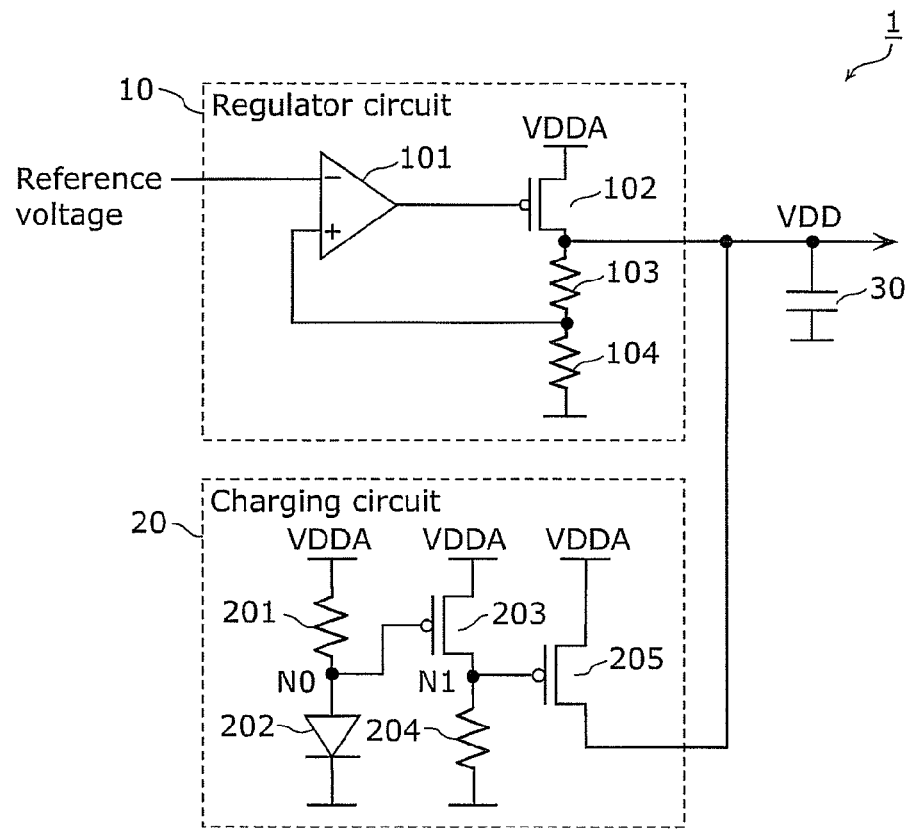
FIG. 1 is a block diagram illustrating an example of configuration of a power source generation circuit according to Embodiment 1.

FIG. 1 is a block diagram illustrating an example of configuration of a power source generation circuit 1 according to this embodiment. The power source generation circuit 1 includes a regulator circuit 10 and a charging circuit 20. The regulator circuit 10, the charging circuit 20 and a capacitor 30 are connected to a given terminal (hereinafter referred to as a VDD terminal) on which an internal power source voltage VDD is generated.

The regulator circuit 10 receives a reference voltage being a predetermined voltage of a constant level from a reference power source (not illustrated) and an external power source voltage VDDA from an external power source (not illustrated). As illustrated in FIG. 1, the regulator circuit 10 includes a differential amplifier 101, a p-type MOS transistor 102, and resistors 103 and 104. In the regulator circuit 10, the level of the internal power source voltage VDD generated at the VDD terminal can be set using the resistance value of the resistors 103 and 104 for example (setting voltage being Vreg).

The differential amplifier 101 receives the reference voltage and a voltage obtained by resistive-dividing the internal power source voltage VDD by use of the resistors 103 and 104 and drives the p-type MOS transistor 102. More specifically, as illustrated in FIG. 1, an inverting input terminal (−) of the differential amplifier 101 is connected to the reference power source and receives the reference voltage. A non-inverting input terminal (+) of the differential amplifier 101 is connected to a connecting point of the resistors 103 and 104 connected in series and receives the voltage obtained by resistive-dividing the internal power source voltage VDD. An output terminal of the differential amplifier 101 is connected to a gate terminal of the p-type MOS transistor 102.

A source of the p-type MOS transistor 102 is connected to the external power source and receives the external power source voltage VDDA. A drain of the p-type MOS transistor 102 is connected to one terminal of the resistor 103 and to the VDD terminal.

The other terminal of the resistor 103 is connected to one terminal of the resistor 104. The other terminal of the resistor 104 is connected to the ground. The level of the internal power source voltage VDD is set by varying the resistance division ratio of the resistors 103 and 104.

The charging circuit 20 is connected to an external power source. When an external power source voltage VDDA supplied from the external power source is equal to or lower than a predetermined threshold voltage, the charging circuit 20 establishes a connection between the external power source and the VDD terminal to charge the capacitor 30 connected to the VDD terminal. As illustrated in FIG. 1, the charging circuit 20 includes resistors 201 and 204, a diode 202, and p-type MOS transistors 203 and 205. The diode 202 may be constituted of an n-type MOS transistor connected as a diode.

One terminal of the resistor 201 is connected to the external power source, and the other terminal (node N0), to an anode of the diode 202.

The anode of the diode 202 is connected to the other terminal of the resistor 201 (node N0), and receives via the resistor 201 the external power source voltage VDDA. A cathode of the diode 202 is earthed, that is, connected to the ground. The node N0, to which the anode of the diode 202 is connected, is connected to a gate of the p-type MOS transistor 203.

A source of the p-type MOS transistor 203 is connected to an external power source, and receives an external power source voltage VDDA. A drain of the p-type MOS transistor 203 is connected to one terminal (node N1) of the resistor 204 having the other terminal connected to the ground, and connected via the resistor 204 to the ground. The node N1, to which the drain of the p-type MOS transistor 203 is connected, is connected to a gate of the p-type MOS transistor 205.

A source of the p-type MOS transistor 205 is connected to an external power source, and receives an external power source voltage VDDA. A drain of the p-type MOS transistor 205 is connected to the VDD terminal.

In an initial state where the power source generation circuit 1 is not initiated yet, the external power source voltage VDDA supplied to the power source generation circuit 1 according to this embodiment is 0 V, and then reaches a predetermined level after the lapse of a given period.

Figure 2:
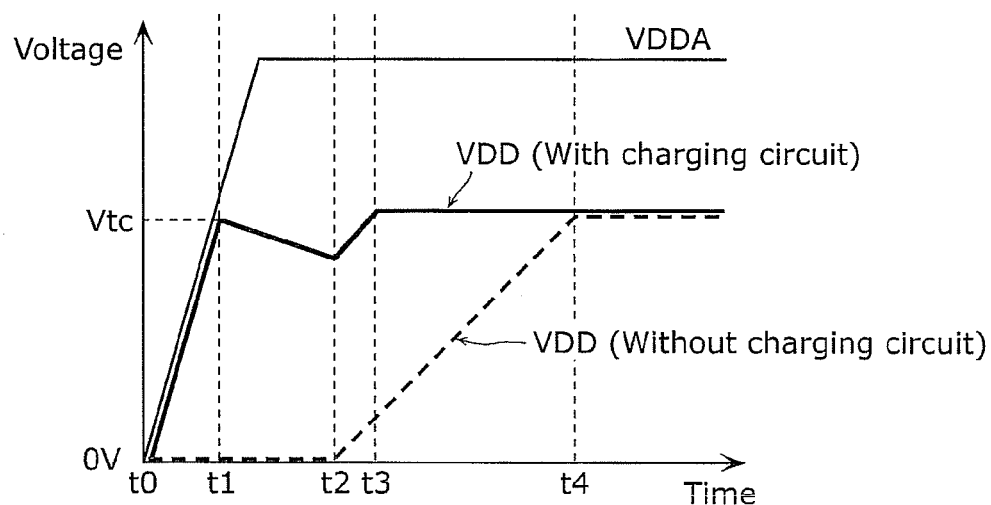
FIG. 2 is a time sequence diagram illustrating an example of operation of the power source generation circuit according to Embodiment 1.

FIG. 2 is a time sequence diagram illustrating an example of operation of the power source generation circuit 1 according to this embodiment. The operation of the power source generation circuit 1 according to this embodiment will be described below with reference to FIG. 2.

First, a case will be described in which only the regulator circuit 10 of the power source generation circuit 1 is operated while the charging circuit 20 is not operated. The waveform of VDD in this case is represented by the thick dotted line "VDD (without charging circuit)" in FIG. 2.

At time t0, the external power source voltage VDDA begins to rise from 0 V. The regulator circuit 10 cannot supply the power source voltage to the VDD terminal during a period from time t0 to time t2. This is because it takes time to charge a capacitor built in the circuit. More specifically, a reference voltage generating circuit (reference power source) generating a reference voltage to be inputted to the differential amplifier 101, a bias generating circuit generating a bias current used to drive the differential amplifier 101, and the regulator circuit 10 itself include a capacitor (not illustrated in FIG. 1) built therein, used for circuit operation stabilization and signal noise countermeasure. Accordingly, when the external power source voltage VDDA rises, it takes time (t2−t0 in the example illustrated in FIG. 2) to charge these built-in capacitors.

At time t2, a bias current and a reference voltage are generated and the regulator circuit 10 is initiated; thus charging of the capacitor 30 starts, and the internal power source voltage VDD rises. Then, the capacitor 30 is charged by the regulator circuit 10 during a period from time t2 to time t3. At time t4, charging of the capacitor 30 is completed, and VDD reaches the setting voltage Vreg set in the regulator circuit 10 and is constant at this level.

A case will now be described in which the charging circuit 20 of the power source generation circuit 1 is also operated in addition to the regulator circuit 10. The waveform of VDD in this case is represented by the thick line "VDD (with charging circuit)" in FIG. 2.

When the external power source voltage VDDA begins to rise from 0 V at time t0, no current flows in the diode 202 and the resistor 201 in the charging circuit 20 and thus the voltage of the node N0 is equal to VDDA. At this time, the p-type MOS transistor 203 goes OFF. Consequently, no current flows in the resistor 204 and the voltage of the node N1 is 0 V. When VDDA is equal to or higher than a threshold voltage |Vtp| of the p-type MOS transistor 205, the p-type MOS transistor 205 turns ON and thus VDDA is connected to the VDD terminal. Consequently, VDD rises depending on the rise of VDDA.

When VDDA further rises and is equal to or higher than a threshold voltage of the diode 202, the diode 202 turns ON and current flows in the resistor 201. As a result, the voltage of the node N0 changes to a level reduced from VDDA by a voltage applied to the resistor 201. When the voltage of the node N0 changes to a level reduced from VDDA by a voltage equal to or higher than a threshold voltage |Vtp| of the p-type MOS transistor 203, the p-type MOS transistor 203 turns ON and current flows in the resistor 204.

At this time, a gate-source voltage |VGS| of the p-type MOS transistor 203 is low; further, the ON resistance of the p-type MOS transistor 203 is high. Accordingly, the voltage of the node N1 is low and the p-type MOS transistor 205 remain unchanged at ON. Thus, VDD rises depending on the rise of VDDA.

When VDDA further rises and reaches a predetermined threshold voltage Vtc at the time t1, the gate-source voltage |VGS| of the p-type MOS transistor 203 increases and the ON resistance of the p-type MOS transistor 203 decreases. Accordingly, the voltage of the node N1 gets closer to VDDA, and a gate-source voltage |VGS| of the p-type MOS transistor 205 decreases so that |VGS| is lower than |Vtp|. As a result, the p-type MOS transistor 205 goes OFF.

At time t1 or later, the p-type MOS transistor 205 is OFF and the charging circuit 20 is not operated. Thus, electric charges accumulated in the capacitor 30 are discharged and VDD gradually lowers. However, at time t2, the regulator circuit 10 starts its operation and the capacitor 30 begins to be charged again. At time t3 earlier than time t4, VDD reaches the setting voltage Vreg set in the regulator circuit 10.

As described above, in the power source generation circuit 1 according to this embodiment, the capacitor 30 is preliminarily charged by the charging circuit 20 before the regulator circuit 10 to starts its operation. Accordingly, a time period from when the regulator circuit 10 starts its operation to when the internal power source voltage VDD reaches the setting voltage Vreg of the regulator circuit 10 can be shortened, thus speeding up generation of the internal power source voltage VDD.

Here, the threshold voltage Vtc at which the p-type MOS transistor 205 turns OFF can be varied by setting parameters of the resistors 201 and 204 and the p-type MOS transistor 203. For example, Vtc becomes lower as the resistance value of the resistor 201 is increased. Vtc becomes lower as the transistor capacity is increased by enlarging the size of the p-type MOS transistor 203. Vtc becomes higher as the resistance value of the resistor 204 is increased.

In a case where the threshold voltage Vtc at which the p-type MOS transistor 205 turns OFF is higher than the setting voltage Vreg of the regulator circuit 10, when VDDA is lower than VTc and higher than Vreg, there is a likelihood that, while the p-type MOS transistor 205 is ON, the p-type MOS transistor 102 turns OFF and VDD becomes equal to VDDA (higher than Vreg) and thus VDD does not become equal to the setting voltage Vreg of the regulator circuit 10. As described above, when parameters of the resistors 201 and 204 and the p-type MOS transistor 203 are adjusted so that Vtc is lower than Vreg, the internal power source voltage VDD can be prevented from becoming equal to or higher than Vreg.

Embodiment 2

A power source generation circuit according to this embodiment includes a trigger signal outputting unit which outputs a predetermined trigger signal and thereby cuts connection by a charging circuit between the given terminal and the external power source. More specifically, in the power source generation circuit according to this embodiment, the trigger signal outputting unit is a delay circuit which receives a starting signal for starting up the power source generation circuit, delays the received starting signal by a given time period, and outputs the delayed starting signal as the trigger signal to the charging circuit, and the charging circuit cuts a connection between the given terminal and the external power source based on the starting signal delayed by the delay circuit. First, a configuration of a power source generation circuit according to this embodiment will be described below with reference to FIG. 3.

Figure 3:
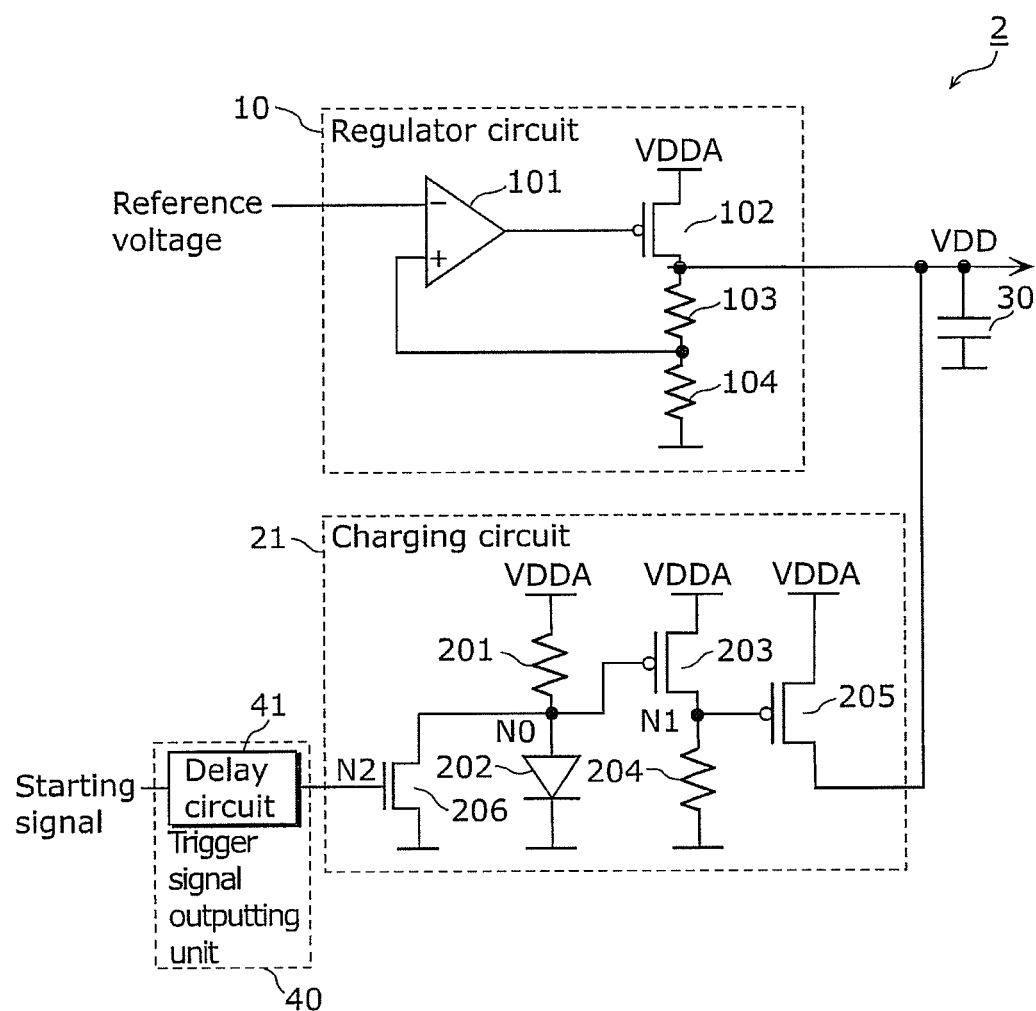
FIG. 3 is a block diagram illustrating an example of configuration of a power source generation circuit according to Embodiment 2.

FIG. 3 is a block diagram illustrating an example of configuration of a power source generation circuit 2 according to this embodiment. The difference of the power source generation circuit 2 of FIG. 3 from the power source generation circuit 1 of FIG. 1 lies in that: the charging circuit 20 is replaced by the charging circuit 21; and a trigger signal outputting unit 40 including a delay circuit 41 is additionally provided. The difference of the charging circuit 21 from the charging circuit 20 of FIG. 1 lies in that an n-type MOS transistor 206 is additionally provided. An explanation of the same configuration as Embodiment 1 is omitted and only the difference will be mainly described.

The trigger signal outputting unit 40 outputs a predetermined trigger signal and thereby cuts connection by the charging circuit 21 between the VDD terminal and an external power source. The trigger signal outputting unit 40 includes, as illustrated in FIG. 3, the delay circuit 41.

The delay circuit 41 is a circuit which delays an input signal by a given time period and outputs the signal. The delay circuit 41 receives a starting signal, delays the starting signal by a given time period, and outputs the delayed starting signal, acting as a trigger signal, to a node N2 being a gate of the n-type MOS transistor 206. A source of the n-type MOS transistor 206 is connected to the ground and a drain thereof, to a node N0.

Here, the starting signal inputted to the delay circuit 41 is, for example, a signal for starting up the power source generation circuit 2, and is used to start rising of an external power source voltage VDDA. Thus, the starting signal is a signal which changes from Low to High at time t0, for example.

The charging circuit 21 charges the capacitor 30 similarly to the charging circuit 20 of Embodiment 1. Further, the charging circuit 21 cuts the connection between the VDD terminal and the external power source according to the starting signal delayed by the delay circuit 41 which is an example of trigger signal. More specifically, a configuration is provided in which, upon reception of the delayed starting signal, the p-type MOS transistor 205 turns OFF.

The operation of the power source generation circuit 2 according to this embodiment will be described below.

At the initial state, when the starting signal is Low, the node N2 is Low and the n-type MOS transistor 206 being OFF. When the MOS transistor 206 is OFF, the operation of the charging circuit 21 is the same as that of the charging circuit 20 of FIG. 1.

When the starting signal changes to High, High (VDDA) is outputted to the node N2 after the lapse of a delay time td set in the delay circuit 41. When the node N2 changes to High, the n-type MOS transistor 206 turns ON. As a result, the node N0 changes to Low and the p-type MOS transistor 203 turns ON; and the node N1 changes to High and the p-type MOS transistor 205 turns OFF.

When the delay time td of the delay circuit 41 is set equal to or greater than a time period from time t0 to time t1, the following advantage is provided; that is, When element variations of the resistors 201 and 204 and the p-type MOS transistor 203 cause the threshold voltage Vtc, at which the p-type MOS transistor 205 turns OFF, to exceed the setting voltage Vreg of the regulator circuit 10, the p-type MOS transistor 205 is also forcibly turned OFF after the lapse of the delay time td. Accordingly, when VDDA is higher than Vreg and lower than Vtc, the internal power source voltage VDD can also be prevented from becoming equal to or higher than Vreg.

As described above, in the power source generation circuit 2 according to this embodiment, after the lapse of a given period since the power source generation circuit 2 was initiated, generation of an internal power source voltage by the charging circuit 21 is forcibly stopped. Accordingly, when effects of element variations or the like causes the threshold voltage of the charging circuit 21 to exceed the setting voltage of the regulator circuit 10, also, the internal power source voltage VDD can be prevented from becoming equal to or higher than the setting voltage of the regulator circuit 10.

Embodiment 3

A power source generation circuit according to this embodiment includes a trigger signal outputting unit similarly to the power source generation circuit according to Embodiment 2. In the power source generation circuit according to Embodiment 3, the trigger signal outputting unit includes a voltage detecting circuit which outputs a voltage detecting signal as the trigger signal to the charging circuit when a voltage generated on the given terminal is equal to or higher than a threshold voltage lower which is equal to or lower than the internal power source voltage, and the charging circuit cuts a connection between the given terminal and the external power source based on the voltage detecting signal outputted by the voltage detecting circuit. First, a configuration of a power source generation circuit according to this embodiment will be described below with reference to FIG. 4.

Figure 4:
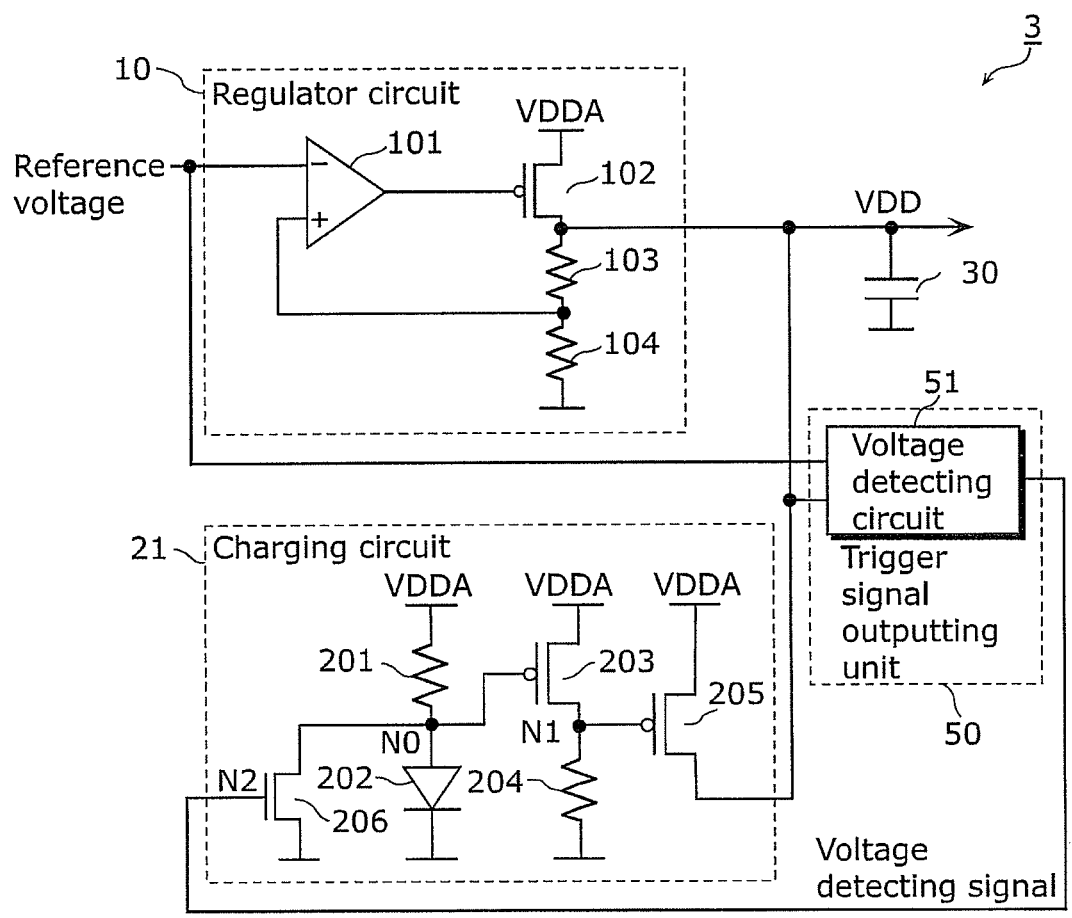
FIG. 4 is a block diagram illustrating an example of configuration of a power source generation circuit according to Embodiment 3.
Figure 5:
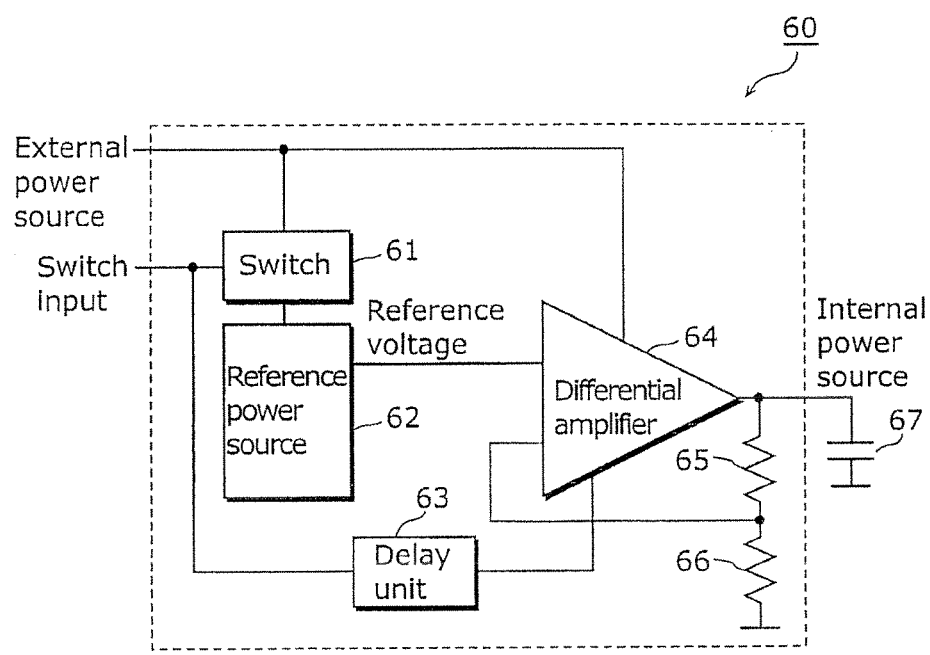
FIG. 5 is a block diagram illustrating a configuration of a conventional power source generation circuit.

FIG. 4 is a block diagram illustrating an example of configuration of the power source generation circuit 3 according to this embodiment. The difference of the power source generation circuit 3 of FIG. 4 from the power source generation circuit 2 of FIG. 3 lies in that: the trigger signal outputting unit 40 including the delay circuit 41 is replaced by a trigger signal outputting unit 50 including a voltage detecting circuit 51. An explanation of the same configuration as Embodiment 2 is omitted and only the difference will be mainly described.

The trigger signal outputting unit 50 outputs a predetermined trigger signal and thereby cuts connection established by the charging circuit 21 between the VDD terminal and an external power source. The trigger signal outputting unit 50 includes, as illustrated in FIG. 4, the voltage detecting circuit 51.

The voltage detecting circuit 51 is a circuit which outputs a voltage detecting signal when a voltage generated at the VDD terminal is equal to or higher than a threshold voltage which is lower than a setting voltage Vreg of the regulator circuit 10. Here, the voltage detecting signal is a signal indicating that a voltage generated at the VDD terminal is equal to or higher than a predetermined threshold voltage. For example, the voltage detecting signal is a signal which changes from Low to High when the voltage generated at the VDD terminal is equal to or higher than the predetermined threshold voltage.

The voltage detecting circuit 51 receives a reference voltage and an internal power source voltage VDD; and when VDD becomes equal to or higher than a detection voltage Vdet equal to a threshold voltage, the voltage detecting signal is changed from Low to High. The voltage detecting signal is supplied to the node N2 being the gate of n-type MOS transistor 206 of the charging circuit 21. The detection voltage Vdet is set lower than the setting voltage Vreg of the regulator circuit 10.

The charging circuit 21 charges the capacitor 30 similarly to the charging circuit 20 according to Embodiment 1. Furthermore, the connection between the VDD terminal and the external power source is cut based on the voltage detecting signal being an exemplary trigger signal, outputted by the voltage detecting circuit 51. More specifically, a configuration is provided in which, when the inputted voltage detecting signal changes from Low to High, the p-type MOS transistor 205 is turned OFF.

The operation of the power source generation circuit 3 according to this embodiment will be described below.

In the power source generation circuit 3 according to this embodiment, when the level of VDD reaches the detection voltage Vdet, the p-type MOS transistor 205 of the charging circuit 21 is turned OFF. When element variations of the resistors 201 and 204 and the p-type MOS transistor 203 cause the threshold voltage Vtc at which the p-type MOS transistor 205 turns OFF, to exceed the setting voltage Vreg of the regulator circuit 10, the p-type MOS transistor 205 is also forcibly turned OFF at a time when the level of VDD becomes equal to or higher than the detection voltage Vdet. Accordingly, when VDDA is higher than Vreg and lower than Vtc, the internal power source voltage VDD can also be prevented from becoming equal to or higher than Vreg.

As described above, in the power source generation circuit 3 according to this embodiment, similarly to the power source generation circuit 2 according to Embodiment 2, after the lapse of a given period since the power source generation circuit 3 was initiated, generation of an internal power source voltage by the charging circuit is forcibly stopped. Accordingly, when effects of element variations or the like causes the threshold voltage of the charging circuit 21 to exceed the setting voltage of the regulator circuit 10, also, the generated level of VDD can be prevented from becoming equal to or higher than the setting voltage of the regulator circuit 10.

The above description is of embodiments of the power source generation circuit according to the present invention. However, the invention is not limited to those specific embodiments. It will be apparent that an embodiment with changes or modifications applied to the embodiments described above, easily conceived by a person skilled in the art, and a combination of constituent elements described in the embodiments can also be included in the technical scope of the invention without departing from the gist of the invention.

For example, it is sufficient that the charging circuits 20 and 21 include a switching transistor having one of the source and drain thereof connected to the external source and the other connected to the VDD terminal. The switching transistor is ON and when the external power source voltage is equal to or lower than the threshold voltage and is OFF when the external power source voltage is higher than the threshold voltage.

In the aforementioned embodiments, the charging circuits 20 and 21 include the p-type MOS transistor 205 acting as the switching transistor. However, the charging circuits 20 and 21 may be constituted of an n-type MOS transistor.

Furthermore, a pulsed external power source voltage may be supplied as the external power source from an external circuit, such as a water meter, generating a pulse signal. The present invention may also be implemented as an integrated circuit which includes a power source generation circuit described above in the embodiments and counts the number of pulses of an inputted pulse signal.

INDUSTRIAL APPLICABILITY

The present invention can be used in an application requiring high-speed and high-accuracy power source voltage generation. For example, in the application of utility meters such as water meters, the present invention is applicable to an integrated circuit which uses an inputted pulse signal as the external power source to generate a power source.

What is claimed is:

1. A power source generation circuit comprising:
   a regulator circuit which receives an external power source voltage from an external power source, generates a predetermined internal power source voltage on a given terminal, and includes a first switching transistor, one of a source and a drain of the first switching transistor being connected to the external power source; and
   a charging circuit which is connected to the external power source, and connects the external power source and the given terminal when the external power source voltage received from the external power source is equal to or lower than a first threshold voltage,
   wherein the charging circuit is configured to supply the external power voltage to the given terminal before the regulator circuit generates the predetermined internal power source voltage on the given terminal.

2. The power source generation circuit according to claim 1, wherein:
   the charging circuit includes a second switching transistor, one of a source and a drain of the second switching transistor being connected to the external power source and another one of the source and the drain of the second switching transistor being connected to the given terminal, and
   the second transistor turns ON when the external power source voltage is equal to or lower than the first threshold voltage and turns OFF when the external power source voltage exceeds the first threshold voltage.

3. The power source generation circuit according to claim 2, wherein the charging circuit includes:
   a first resistor having one terminal connected to the external power source;
   a second resistor having one terminal connected to a ground;
   a diode having an anode connected to another terminal of the first resistor and a cathode connected to the ground;
   a first p-type Metal Oxide Semiconductor (MOS) transistor having a gate connected to the anode of the diode, a source connected to the external power source, and a drain connected to another terminal of the second resistor; and
   a second p-type MOS transistor being the second switching transistor, and having a gate connected to the drain of the first p-type MOS transistor, a source connected to the external power source, and a drain connected to the given terminal.

4. The power source generation circuit according to claim 1, wherein the first threshold voltage is lower than the internal power source voltage.

5. The power source generation circuit according to claim 1, further comprising a trigger signal outputting unit configured to output a predetermined trigger signal to cut connection by the charging circuit between the given terminal and the external power source.

6. The power source generation circuit according to claim 5, wherein:
   the trigger signal outputting unit includes a delay circuit which receives a starting signal for starting up the power source generation circuit, delays the received starting signal by a given time period, and outputs the delayed starting signal as the trigger signal to the charging circuit, and
   the charging circuit cuts a connection between the given terminal and the external power source based on the starting signal delayed by the delay circuit.

7. The power source generation circuit according to claim 5, wherein:
   the trigger signal outputting unit includes a voltage detecting circuit which outputs a voltage detecting signal as the trigger signal to the charging circuit when a voltage generated on the given terminal is equal to or higher than a second threshold voltage lower than the internal power source voltage, and
   the charging circuit cuts a connection between the given terminal and the external power source based on the voltage detecting signal outputted by the voltage detecting circuit.

8. The power source generation circuit according to claim 6, wherein:
   the charging circuit includes a second switching transistor, one of a source and a drain of the second switching transistor being connected to the external power source and another one of the source and the drain of the second switching transistor being connected to the given terminal, and
   the second switching transistor turns ON when the external power source voltage is equal to or lower than the first threshold voltage and turns OFF when the external power source voltage exceeds the first threshold voltage or based on the trigger signal.

9. The power source generation circuit according to claim 8, wherein the charging circuit includes:
   a first resistor having one terminal connected to the external power source;
   a second resistor having one terminal connected to a ground;
   a diode having an anode connected to another terminal of the first resistor and a cathode connected to the ground;

a first p-type MOS transistor having a gate connected to the anode of the diode, a source connected to the external power source, and a drain connected to another terminal of the second resistor;

a second p-type MOS transistor being the second switching transistor, and having a gate connected to the drain of the first p-type MOS transistor, a source connected to the external power source, and a drain connected to the given terminal; and an n-type MOS transistor having a gate receiving the trigger signal, a drain connected to the gate of the first p-type MOS transistor, and a source connected to the ground.

10. An integrated circuit comprising:

a regulator circuit which receives a pulsed external power source voltage from an external circuit, generates a predetermined internal power source voltage on a given terminal, and includes a first switching transistor, one of a source and a drain of the first switching transistor being connected to the external circuit; and a charging circuit which is connected to the external circuit and, connects the external circuit and the given terminal when an external power source voltage received from the external circuit is equal to or lower than a predetermined threshold voltage, wherein the charging circuit is configured to output the pulsed external power voltage to the given terminal before the regulator circuit generates the predetermined internal power source voltage on the given terminal.

11. An integrated circuit comprising:

a regulator circuit which receives an external power source voltage from an external power source and provides a predetermined power source voltage generated internally, and includes a first switching transistor, a source of the first switching transistor being connected to the external power source; and a charging circuit which includes a second switching transistor having a source connected to the external power source and a drain connected to a first terminal, wherein:

the second switching transistor turns ON to provide the external power source voltage received from the external power source to the first terminal via the second switching transistor when the external power source voltage is below a predetermined threshold voltage, the first switching transistor is a first p-type Metal Oxide Semiconductor (MOS) transistor, the second switching transistor is a second p-type MOS transistor having a gate that is controlled based on the external power source voltage and a variable input signal, a source-drain path of the first p-type MOS transistor and a source-drain path of the second p-type MOS transistor are not connected in series, and the charging circuit is configured to supply the external power source voltage to the first terminal before the regulator circuit generates the predetermined power source voltage on the first terminal.

12. The integrated circuit according to claim 11, wherein a drain of the first p-type MOS transistor and a drain of the second p-type MOS transistor are connected in common to a capacitor.

13. The integrated circuit according to claim 12, wherein the drain of the first p-type MOS transistor and the drain of the second p-type MOS transistor are connected in common to a capacitor via a third terminal.

14. The integrated circuit according to claim 11, wherein the second switching transistor can be controlled by a single external input signal.

15. The integrated circuit according to claim 14, wherein the second switching transistor can be turned OFF by the single external input signal.

16. The integrated circuit according to claim 11, wherein the second switching transistor can be automatically turned OFF based on a voltage detected internally.

17. The integrated circuit according to claim 11, wherein:

the variable input signal is applied to a second terminal, and the second terminal is not on a path between the gate of the second p-type MOS transistor and the external power source.

18. The integrated circuit according to claim 11, wherein a gate signal applied to the gate of the second p-type MOS transistor controlled based on the external power source voltage and the variable input signal is not supplied to the regulator circuit.

19. An integrated circuit comprising:

a regulator circuit which receives an external power source voltage from an external power source and provides a predetermined power source voltage generated internally, and includes a first switching transistor, one of a source and a drain of the first switching transistor being connected to the external power source; and a charging circuit which includes a second switching transistor with one of a source and a drain connected to the external power source and another of the source and the drain connected to a first terminal, wherein:

the second switching transistor turns ON to provide the external power source voltage received from the external power source to the first terminal via the second switching transistor when the external power source voltage is below a predetermined threshold voltage, the first switching transistor is a first Metal Oxide Semiconductor (MOS) transistor, the second switching transistor is a second MOS transistor having a gate controlled based on the external power source voltage and a variable input signal applied to a second terminal, the second terminal is not on a path between the gate of the second MOS transistor and the external power source, and the charging circuit is configured to supply the external power source voltage to the first terminal before the regulator circuit generates the predetermined power source voltage on the first terminal.

20. The integrated circuit according to claim 19, wherein a gate signal applied to the gate of the second MOS transistor controlled based on the external power source voltage and the variable input signal is not supplied to the regulator circuit.

21. An integrated circuit comprising:

a first circuit which receives an external power source voltage from an external power source and provides a predetermined power source voltage generated internally, and includes a first Metal Oxide Semiconductor (MOS) transistor, one of a source and a drain of the first MOS transistor being connected to the external power source; and a second circuit which includes a second MOS transistor with one of a source and a drain connected to the external power source and another of the source and the drain connected to a first terminal, wherein:

the second MOS transistor turns ON to provide the external power source voltage received from the external power source to the first terminal via the second MOS transistor when the external power source voltage is below a predetermined threshold voltage,
a gate signal applied to a gate of the second MOS transistor is controlled based on the external power source voltage and a variable signal,
the gate signal is not supplied to the first circuit, and
the charging circuit is configured to supply the external power source voltage to the first terminal before the regulator circuit generates the predetermined power source voltage on the first terminal.

\* \* \* \* \*